United States Patent [19]
Erhart et al.

[11] Patent Number: 5,381,133
[45] Date of Patent: Jan. 10, 1995

[54] SELECTIVE CALL RECEIVER WITH BATTERY SAVING FEATURES AND METHOD THEREFOR

[75] Inventors: Richard A. Erhart, Chandler, Ariz.; Renee Zuleta, Delray Beach; David J. Hayes, Plantation, both of Fla.

[73] Assignee: Motorola, Inc., Schaumburg, Ill.

[21] Appl. No.: 8,124

[22] Filed: Jan. 25, 1993

[51] Int. Cl.⁶ .............................................. H04Q 7/00
[52] U.S. Cl. .............................. 340/825.44; 455/38.3; 455/343
[58] Field of Search .................. 340/825.44; 455/38.3, 455/343; 379/57

[56] References Cited

U.S. PATENT DOCUMENTS

| | | |
|---|---|---|
| 4,518,961 | 5/1985 | Davis et al. ............... 340/825.44 |
| 4,663,623 | 5/1987 | Lax et al. . |
| 4,839,639 | 6/1989 | Sato et al. . |
| 4,961,073 | 10/1990 | Drapac et al. . |
| 4,995,099 | 2/1991 | Davis . |
| 4,996,526 | 2/1991 | DeLuca . |
| 5,073,905 | 12/1991 | Dapper et al. ............... 375/106 |
| 5,077,758 | 12/1991 | DeLuca et al. . |
| 5,095,498 | 3/1992 | DeLuca et al. . |
| 5,230,084 | 7/1993 | Nguyen ............................. 455/38.3 |
| 5,239,306 | 8/1993 | Siwiak et al. ............... 340/825.44 |
| 5,274,843 | 12/1993 | Murai et al. ....................... 455/343 |

*Primary Examiner*—Donald J. Yusko
*Assistant Examiner*—Edward Merz
*Attorney, Agent, or Firm*—Keith A. Chanroo; John H. Moore

[57] ABSTRACT

A selective call receiver (200) includes a receiver (204) receiving paging signals including a preamble, a synchronization codeword, and at least address information. A controller (206) controlling a supply of power to the receiver for receiving the paging signals. A synchronization obtaining circuitry (404, 406, 224), coupled to the receiver (204), obtains synchronization to the paging signal. The synchronization obtaining circuitry (404, 406, 224) includes a baud rate detector and synchronization codeword detector, coupled to the baud rate detector, detects the synchronization codeword. An address decoder, responsive to the synchronization codeword being detected, decodes the address information. A synchronization maintaining circuitry (404, 408, 224) maintains synchronization to the paging signals during address decoding. The synchronization maintaining circuitry (404, 408, 224) includes circuitry for enabling the power switch (210) which enables the receiver (204) for receiving the paging signals. The baud rate detector (224), responsive to the power being supplied to the receiver (204), detects baud rate during at least first (150) and second (152) portions of the address. A preamble detector (404), responsive to the second portion of the address being received, detects preamble during at least a portion of a second address (152).

8 Claims, 6 Drawing Sheets

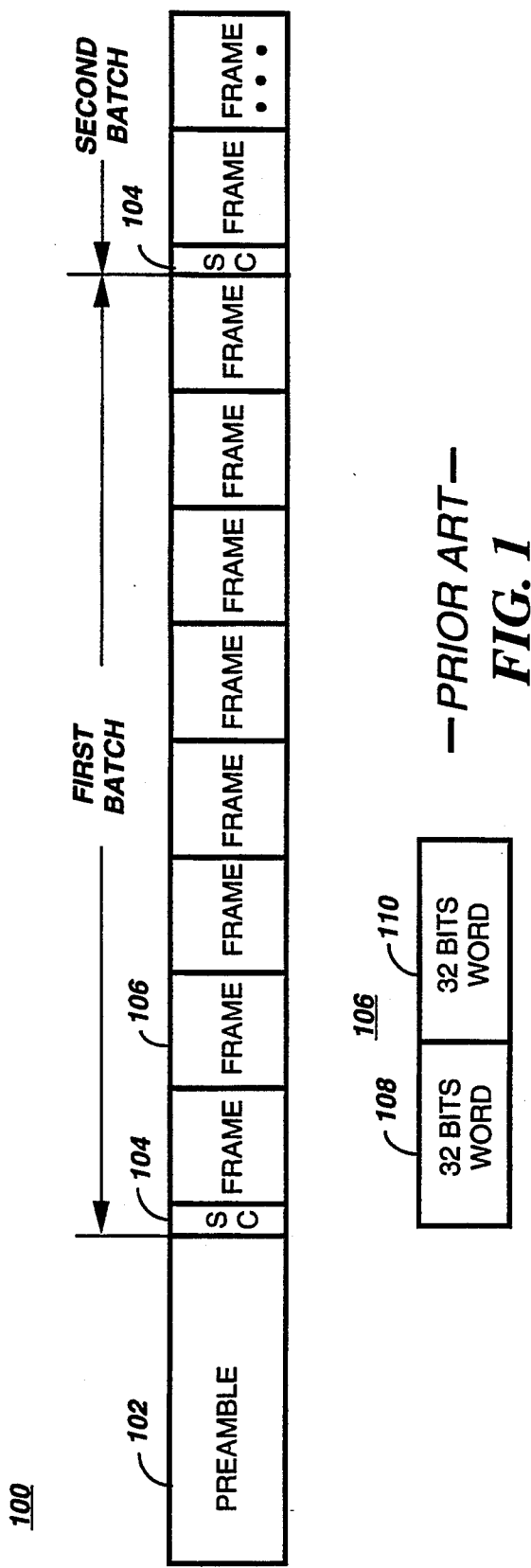
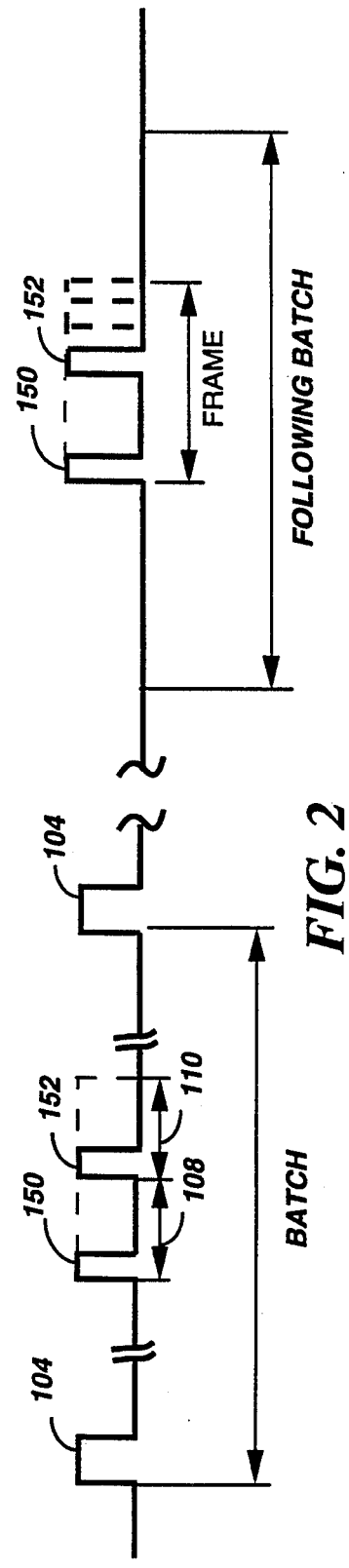
—PRIOR ART—
FIG. 1
FIG. 2

SELECTIVE CALL RECEIVER WITH BATTERY SAVING FEATURES AND METHOD THEREFOR

FIELD OF THE INVENTION

This invention relates in general to selective call receivers and more particularly to selective call receivers with battery saving features and method therefor.

BACKGROUND OF THE INVENTION

With the reduction of the size of selective call receivers and the need for portableness and convenience, selective call receivers primarily depend upon battery power supplied by limited energy content batteries. Thus, users desire power conserving methods in the selective call receivers which improve battery life. One of the primary current draining circuits in a selective call receiver is the receiver circuitry. The receiver circuitry must necessarily be energized to allow the selective call receiver to receive radio signals intended for reception by the selective call receiver, however, the receiver circuitry can be de-energized during other operations of the selective call receiver.

An example of a conventional power conserving method involves determining whether the carrier frequency indicates transmissions intended for the radio receiver are being received. It can be quickly determined whether a carrier frequency is received, but a radio system may broadcast numerous types of information on the carrier frequency, some of which are not intended for the selective call receiver which may cause an unknowing receiver to expend battery power unnecessarily.

Selective call receivers can improve battery life by having the receiver circuitry energized only during portions of the preamble of the signalling protocol received and only during the address portions of selective call messages received to determine if a message is addressed to the selective call receiver. But typical battery saving methods require that the receiver circuitry be energized during the reception of a sufficient portion of each address received to perform address correlation to determine quickly whether the address is that of the selective call receiver or not. In addition, typical battery saving methods require that the selective call receiver know when addresses are received within the signalling protocol. For example, conventional battery saving methods can take advantage of the frame assignments and the occurrences of addresses at predetermined positions within the Post Office Code Standardization Advisory Group (POCSAG) signalling protocol. Also, before detection of its address, the selective call receiver must detect the synchronization codeword which enables the selective call receiver to achieve word synchronization.

Thus, what is needed is a battery saving method which would conserve power by energizing the receiver circuitry for periods shorter than conventional detection periods for preamble detection, address correlation and synchronization codeword detection.

SUMMARY OF THE INVENTION

A selective call receiver comprises means for receiving paging signals including a preamble, a synchronization codeword, and at least an address information. Means for controlling a supply of power to said receiving means for receiving the paging signals. Means, coupled to the receiving means, obtains synchronization to the paging signal. The synchronization obtaining means comprises means for detecting baud rate; and means, coupled to the baud rate detecting means, for detecting the synchronization codeword. Means, responsive to the synchronization codeword being detected, decodes the address information. Means for maintaining synchronization to the paging signals during the address decoding. The synchronization maintaining means comprises means for selectively enabling the power supply controlling means for receiving the paging signals. The baud rate detecting means, responsive to the power being supplied to the receiving means, detects baud rate during at least first and second portions of the address. Means, responsive to the second portion of the address being received, for detecting preamble during at least a portion of a second address.

A method for reducing power consumption in a selective call receiver which consumes power, the method comprising the steps of:

(a) receiving paging signals including a preamble, a synchronization codeword, and at least an address information;
(b) controlling a supply of power to said receiving means for receiving the paging signals;
(c) obtaining synchronization to the paging signal wherein the steps of obtaining synchronization comprising the steps of:
 (d) detecting baud rate; and
 (e) detecting the synchronization codeword;
(f) decoding the address information in response to step (c);
(g) maintaining synchronization to the paging signals during the address decoding, said step of maintaining synchronization, comprising the steps of:
 (h) selectively enabling the power supply controlling means for receiving the paging signals;
 (i) detecting baud rate during at least first and second portions of the address; and
 (j) detecting preamble during at least a portion of a second address.

BRIEF DESCRIPTION OF THE DRAWINGS

FIG. 1 is a signaling diagram of a prior art POCSAG protocol signal.

FIG. 2 is a timing diagram illustrating the address detecting scheme in accordance with the preferred embodiment of the present invention.

DESCRIPTION OF A PREFERRED EMBODIMENT

Figure 3:
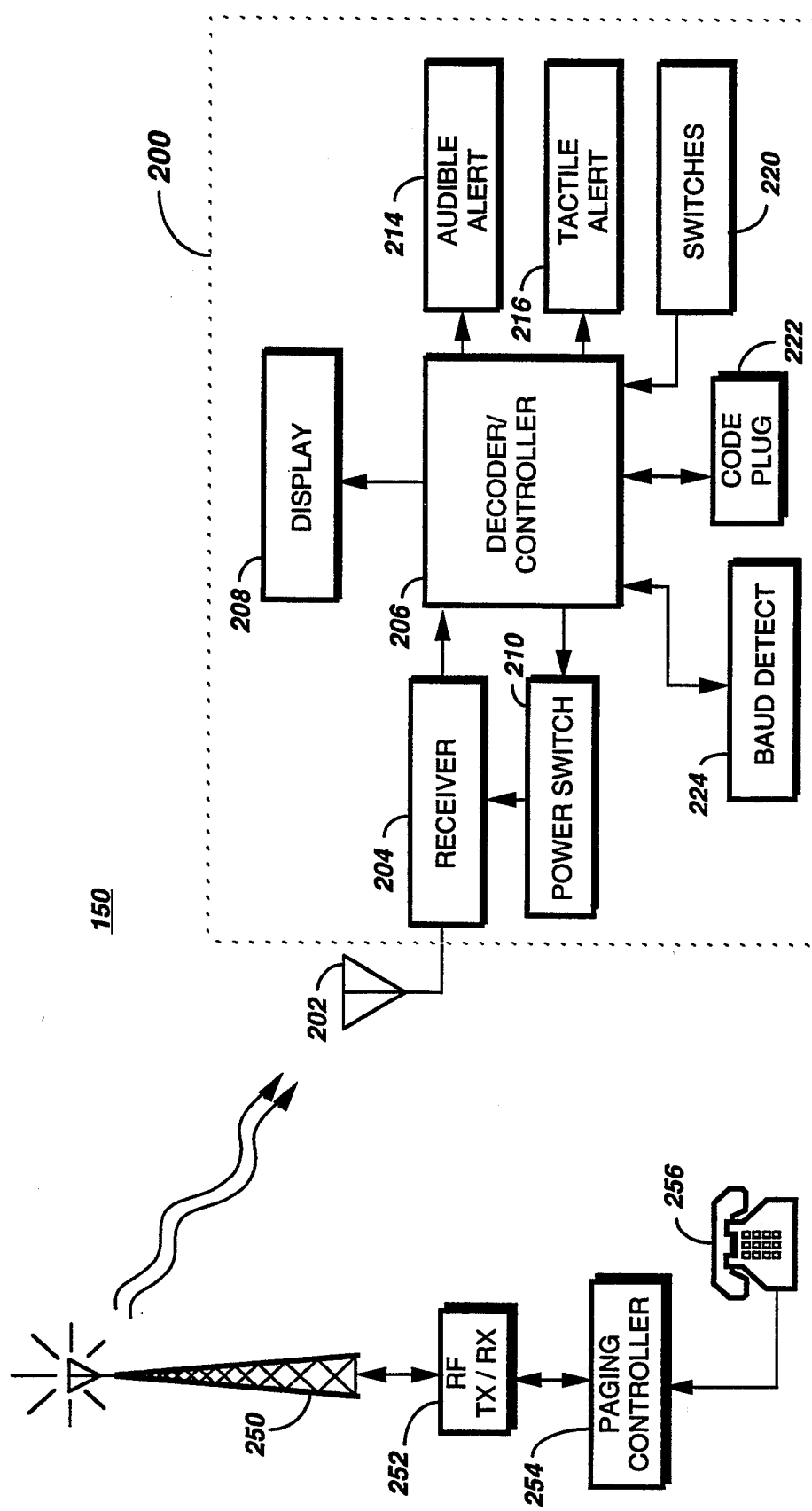
FIG. 3 is an electrical block diagram of a paging system illustrating a paging transmitter and a selective call receiver in accordance with the preferred embodiment of the present information.

Referring to FIG. 1, a signaling diagram of the conventional Post Office Code Standardization Advisory Group (POCSAG) protocol signal comprises a series of address and/or message information intended for an individual selective call receiver or groups of selective call receivers assigned to a paging system. The series of addresses are assembled in accordance with requests and transmitted as a continuous transmission. The transmission is of a digital format and starts with a preamble 102 of at least 576 bits, equivalent to the duration of a batch and one additional codeword. The preamble 102 is followed by one or more batches of addresses and message codewords. Each batch begins with a synchronization codeword (SC) 104 followed by eight frames 106, each frame 106 having a duration equivalent to two codewords 108, 110, namely an address codeword and/or a message codeword.

As shown in FIG. 2, the timing diagram in accordance with the present invention indicates that the selective call receiver searches received signal for synchronization word (SC) 104 at least once after the detection of preamble 102. However, thereafter, the synchronization codeword 104 need not be decoded within every batch before decoding the received address words 150, 152, but requires, at a minimum, the detection of the baud rate of the received information while the addresses are being decoded to determine whether the selective call receiver is synchronized to the POCSAG protocol signal or to another protocol signal. This is illustrated in the latter portion of FIG. 2 which shows the timing requirement for decoding at least a first and a second portion of a first and second addresses 150, 152 to be discussed further below.

FIG. 3 is an electrical block diagram of a paging system 150 illustrating a paging transmitter and a selective call receiver in accordance with the preferred embodiment of the present invention. The paging transmitter is coupled to an input device, for example, a telephone 256 for inputting messages or initiating pages via a paging controller 254. The paging controller 254 generates, inter alia, the pages to be transmitted to respective selective call receivers 200 according to, for example, the POCSAG signalling protocol. The paging controller 254 is coupled to the radio frequency transmitter/receiver 252 which transmits the pages via the antenna 250. Receiving, processing and transmitting selective call messages is well known in the art to one of ordinary skill.

The pages are received by a selective call receiver 200. The selective call receiver 200 comprises an antenna 202 for intercepting transmitted radio frequency (RF) signals which are coupled to the input of a receiver 204. The RF signals are preferably selective call (paging) message signals which provide, for example, a receiver address and an associated message, such as numeric or alphanumeric message. However, it will be appreciated that other well known paging signaling formats, such as tone only signaling or tone and voice signaling, would be suitable for use as well. The receiver 204 processes the RF signal and produces at the output a data stream representative of a demodulated data information. The demodulated data information is coupled into the input of a decoder/controller 206 which processes the information in a manner well known in the art. A baud detector 224, coupled to the controller 206, is used to detect the baud rate of the received paging signal. A power switch 210, coupled to the decoder/controller 206, is used to control the supply of power to the receiver 204, thereby providing a battery saving function which will be further discussed in detail below.

For purposes of this illustration, it will be assumed that the POCSAG signaling format is utilized which is well known in the art, although other signaling formats could be utilized as well. When the address is received by the decoder/controller 206, the received address is compared with one or more addresses stored in a code plug (or code memory) 222, and when a match is detected, an alert signal is generated to alert a user that a selective call message, or page, has been received. The alert signal is directed to an audible alerting device 214 for generating an audible alert or to a tactile alerting device 216 for generating a silent vibrating alert. Switches 220 allow the user of the selective call receiver to, among other things, select between the audible alert 214 and the tactile alert 216 in a manner well known in the art.

The message information which is subsequently received is stored in memory 304 (FIG. 4) and can be accessed by the user for display using one or more of the switches 220 which provide such additional functions as reset, read, and delete, etc. Specifically, by the use of appropriate functions provided by the switches 220, the stored message is recovered from memory and processed by the decoder/controller 206 for displaying by a display 208 which enables the user to view the message.

Figure 4:
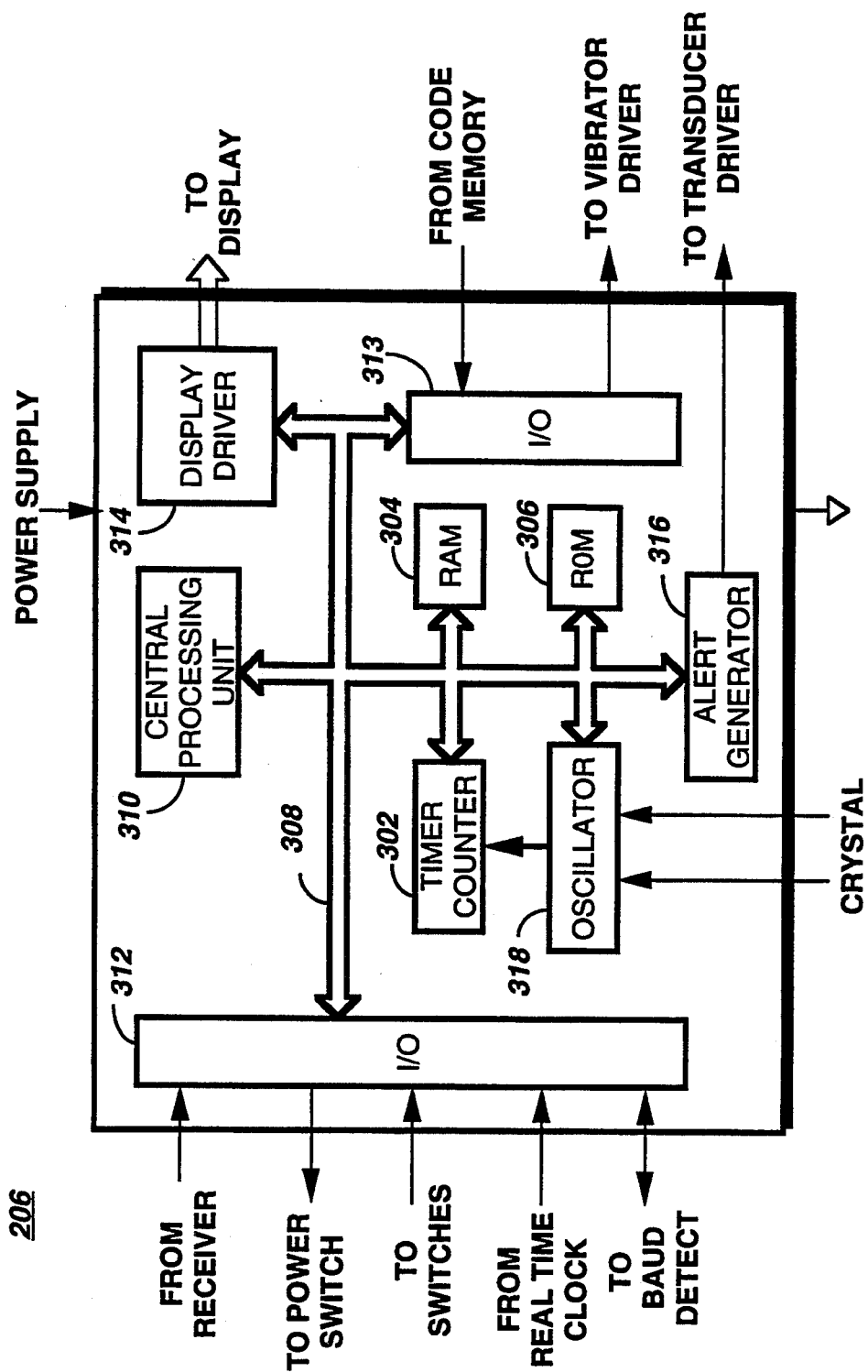
FIG. 4 is an electrical block diagram of the microcomputer used in the selective call receiver of FIG. 3.

The controller/decoder 206 of FIG. 3 can be implemented utilizing a microcomputer as shown in FIG. 4. FIG. 4 is an electrical block diagram of a microcomputer based decoder/controller suitable for use in the selective call receiver of FIG. 3. As shown, the microcomputer 206 is preferably an MC68HC05 microcomputer, such as manufactured by Motorola, Inc., which includes an on-board display driver 314. The microcomputer 206 includes an oscillator 318 which generates the timing signals utilized in the operation of the microcomputer 206. A crystal, or crystal oscillator (not shown) is coupled to the inputs of the oscillator 318 to provide a reference signal for establishing the microcomputer timing. A timer/counter 302 couples to the oscillator 318 and provides programmable timing functions which are utilized in controlling the operation of the receiver or the processor. A RAM (random access memory) 304 is utilized to store variables derived during processing, as well as to provide storage of message information which are received during operation as a selective call receiver. A ROM (read only memory) 306 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 318, timer/counter 302, RAM 304, and ROM 306 are coupled through an address-/data/control bus 308 to a central processing unit (CPU) 310 which performs the instructions and controls the operations of the microcomputer 206.

The demodulated data generated by the receiver is coupled into the microcomputer 206 through an input/output (I/O) port 312. The demodulated data is processed by the CPU 310, and when the received address is the same as stored within the code-plug memory which couples into the microcomputer through, for example, an I/O port 313, the message, if any, is received and stored in RAM 304. Recovery of the stored message, and selection of the predetermined destination address, is provided by the switches which are coupled to the I/O port 312. The microcomputer 206 then recovers the stored message and directs the information over the data bus 308 to the display driver 314 which processes the information and formats the information for presentation by a display 208 (FIG. 3) such as an LCD (liquid crystal display). At the time a selective call receiver's address is received, the alert signal is generated which can be routed through the data bus 308 to an alert generator 316 that generates the alert enable signal which is coupled to the audible alert device that was described above. Alternatively, when the vibrator alert is selected, as described above, the microcomputer generates an alert enable signal which is coupled through data bus 308 to the I/O port 313 to enable generation of a vibratory, or silent alert.

The battery saver operation is controlled by the CPU 310 with battery saving signals which are directed over the data bus 308 to the I/O port 312 which couples to the power switch 210. Power is periodically supplied to the receiver to enable decoding of the received selective call receiver address signals and any message information which is directed to the receiver or to the transmitter.

Figure 5:
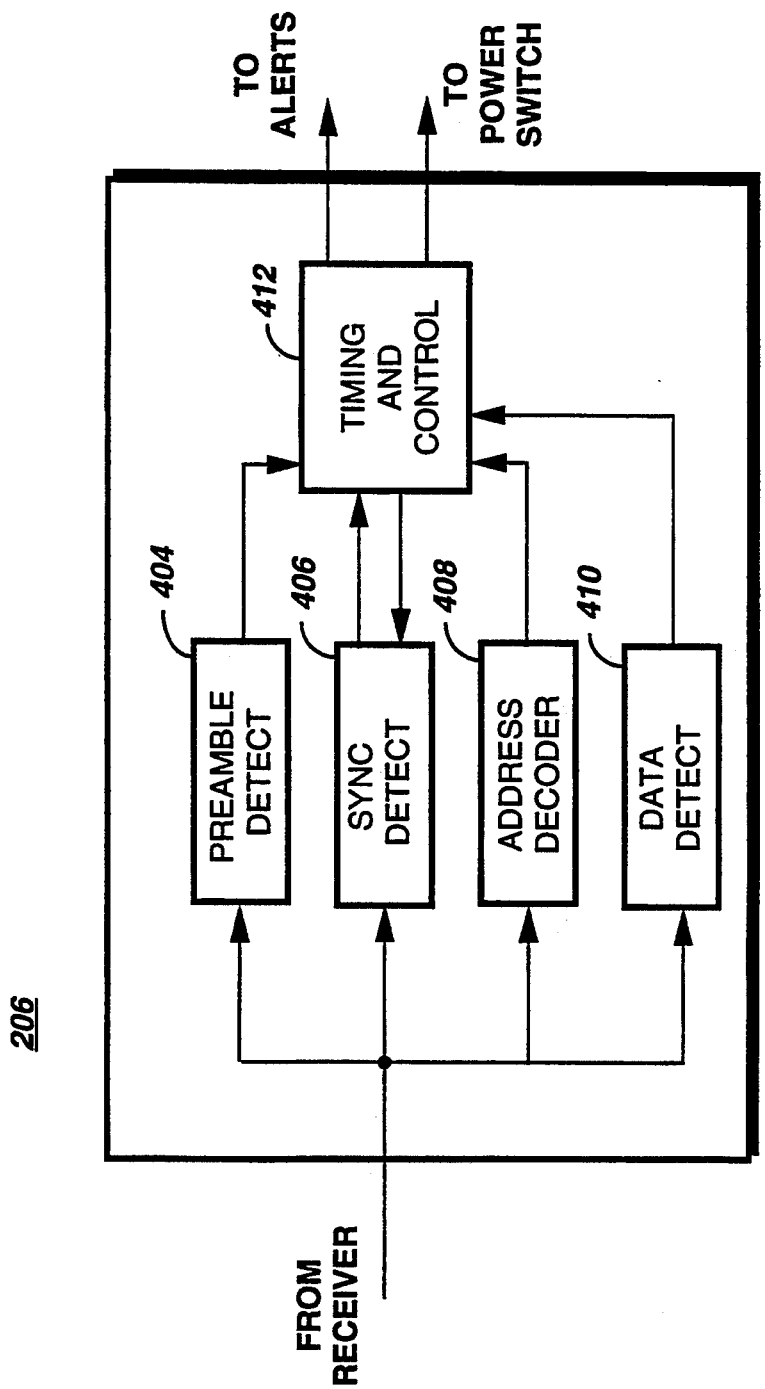
FIG. 5 is an electrical block diagram of the decoding arrangement of the microcomputer shown in FIG. 4.

Referring to FIG. 5, an electrical block diagram of the decoding arrangement of the microcomputer is shown in FIG. 4. As discussed above, the ROM stores subroutines for controlling the operations of the selective call receiver. However, one of ordinary skill in the art will appreciate that the operations of the selective call receiver may also by controlled by hardware circuitry. According to the preferred embodiment of the present invention, the selective call receiver 200 via the baud detect circuitry 224 (FIG. 3) detects tile baud rate of the received signal. When a valid baud rate is detected, the selective call receiver 200 searches the POCSAG signal protocol for preamble by means of a preamble detector (or preamble detect) 404 in order to obtain bit synchronization. A synchronization codeword detector (sync detect) 406 searches for the synchronization codeword (SC) to determine word synchronization as is well known to one of ordinary skill in the art. When preamble and synchronization codeword are detected, the selective call receiver will evaluate its assigned frame to attempt to locate its assigned address. Also, when the assigned frame is not the next frame, a timing and control block 412 sends a signal to the power switch 210 which turns off power to the receiver 204 of the selective call receiver 200 until the assigned frame arrives. In the assigned frame, an address decoder 408 detects at least the first eight bits of the first address word 150 which is correlated, and when the correlation matches, the rest of the address is decoded to determine if the received address matches the assigned address within at least two bits of error. During address decoding of the first eight bits, the baud rate detector (baud detect) 224 (FIG. 3) is also detecting the baud rate of the received signal to determine if the signal being received is a valid or an invalid baud rate. If address is not recognized for the first eight bits of the first address, the receiver turns off until the arrival of a second address within the assigned frame. When the second address is received, baud rate and preamble detections are also performed during the first eight bits of the second address. The receiver remains on for only eight bits unless (1) the address is matched within a two bit error; (2) the preamble is matched within one bit error; or (3) the baud rate detect failed over sixteen bit tinge intervals which includes the two eight bits of the first and second addresses. However, it: the baud rate detect failed only on the eight bits of the second address, the failure is noted by the micro-computer.

Additionally, when any of the three conditions are met, the receiver will remain on for an additional eight bit time interval. When any of the three conditions remain valid during the additional eight bit time interval, the receiver will remain on until the thirty-two bits of the second address are correlated. Also, during address correlation; (1) if the address matches within two bit error; or (2) valid baud rate is detected and preamble is not detected, the receiver will remain in the synchronous mode of operation characterized by normal POCSAG decoding. However, if the preamble was found within two bit errors on the thirty-two bit address word with valid baud being detected or (2) if the invalid baud rate being detected on fifty-six bits, the receiver will exit the synchronous mode and start decoding for preamble asynchronously.

In this way, the receiver, by decoding the address information, maintains synchronization with the received signal, and when the receiver does not detect any recognizable address bits during the first eight bits of the first address, the receiver battery saves until it is time to receive the second address. During this tinge, the receiver can determine if valid information is being received, and if so, continues in the synchronous mode of operation, or otherwise, proceeds to search for the preamble and the synchronization codeword in the asynchronous mode under the assumption that the receiver has lost synchronization with the received signal, or is not receiving any valid signal. The receiver therefore advantageously uses address or data words to achieve synchronization by detecting baud rate information. The receiver also searches for preamble when the address is not decoded in the first address codeword to enable the receiver to quickly determine if the receiver is now receiving preamble information because it has lost synchronization to the previous signal. Accordingly, the receiver improves battery savings because the receiver can quickly determine if synchronization was lost by determining if preamble is being detected during the tinge allotted to the second address codeword.

Furthermore, while the selective call receiver increases battery life by improving battery saving features, the selective call receiver will increase receiver "on-tinge" when two invalid baud rate detection are detected in sixteen bit times (i.e., the two first eight-bits of the first and second eight bit addresses). However, this increase in receiver "on-time" takes effect eight bits at a time which does not significantly affect battery life, and results in an extremely robust method for optimizing battery life while minimizing errors in the receiver.

Figure 6:
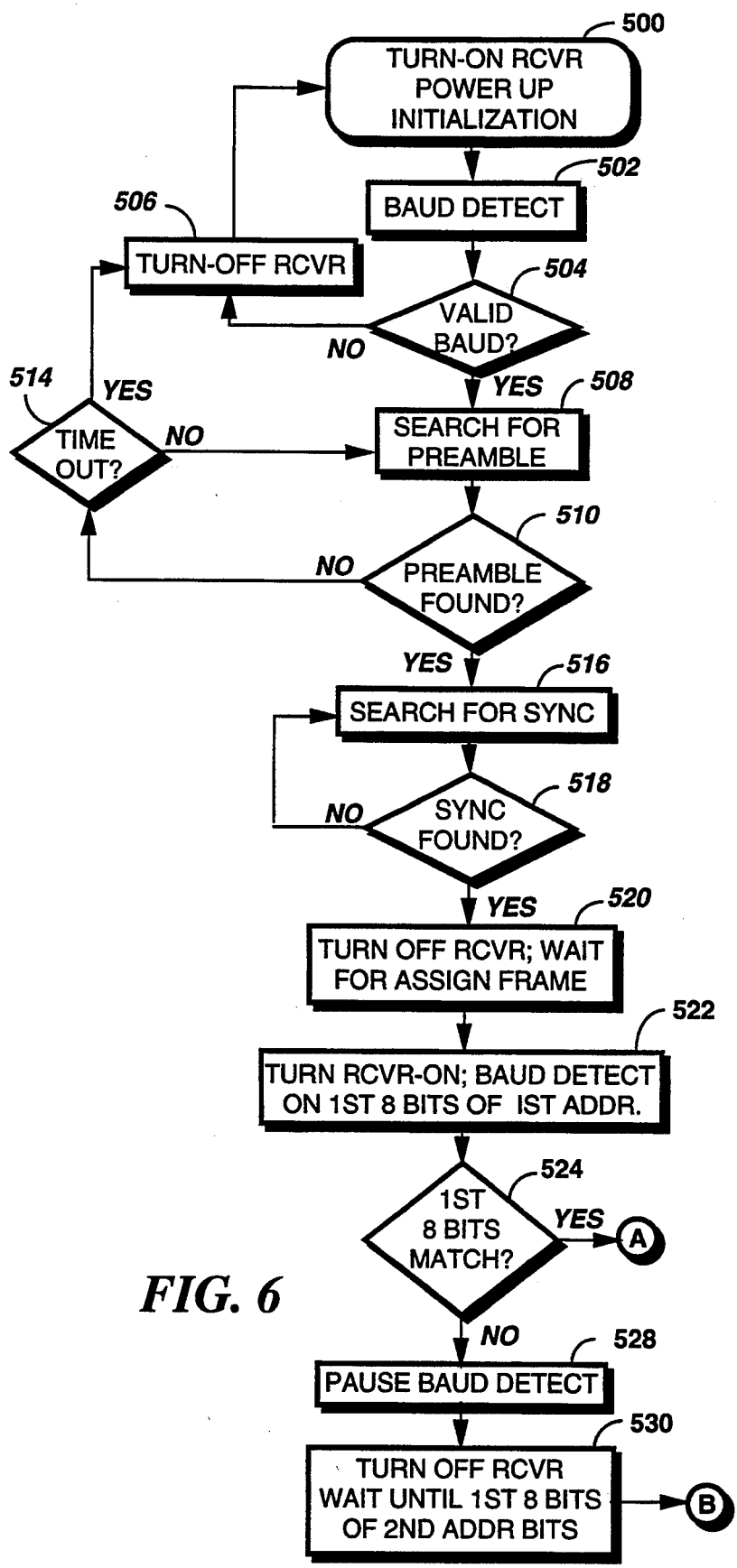
FIGS. 6 and 7 are flow diagrams illustrating the operation of the selective call receiver of FIG. 3

Referring to the flow diagram of FIG. 6, the preferred operation of the selective call receiver is illustrated. The selective call receiver powers up and initializes all variables, step 500. The baud detect circuitry starts detecting the received information to detect when a valid baud rate is being received, step 502. In step 504, the baud rate is checked to determine whether a valid or an invalid baud rate was received. When the invalid baud rate is detected, the receiver is turned off via the power switch 210, step 506. Alternately, when the valid baud rate has been detected, step 504, the preamble detector starts evaluating the received data for preamble, step 508. Step 510 determines whether preamble is detected. When preamble is not detected, a time-out routine is entered, step 514. When the time-out period has not expired, the search for preamble continues at step 508. However, when the tinge-out period has expired, the receiver turns-off, step 506. Alternately, at step 510, when preamble is detected, a sync detector begins detecting for the synchronization codeword, step 516. Step 518 detects when the synchronization codeword is being received. If no, the receiver continues searching for synchronization codeword at step 516. Alternately, when the synchronization codeword is detected, in step 518, the receiver turns off, when possible, and waits until the arrival of its assigned frame, step 520. At the arrival of the assigned frame, the receiver powers up to receive its assigned frame, and the, baud detect circuitry begins searching for a valid baud rate during the first eight bits of the first address, step 522. When the first eight bits of the first address do not match the address stored in codeplug, step 524, the baud rate detection is paused, step 528. The receiver circuitry is turned off until the arrival of the first eight bits of the second address (i.e., first eight bits of the second codeword of the frame) to continue baud rate detection, step 530.

Figure 7:
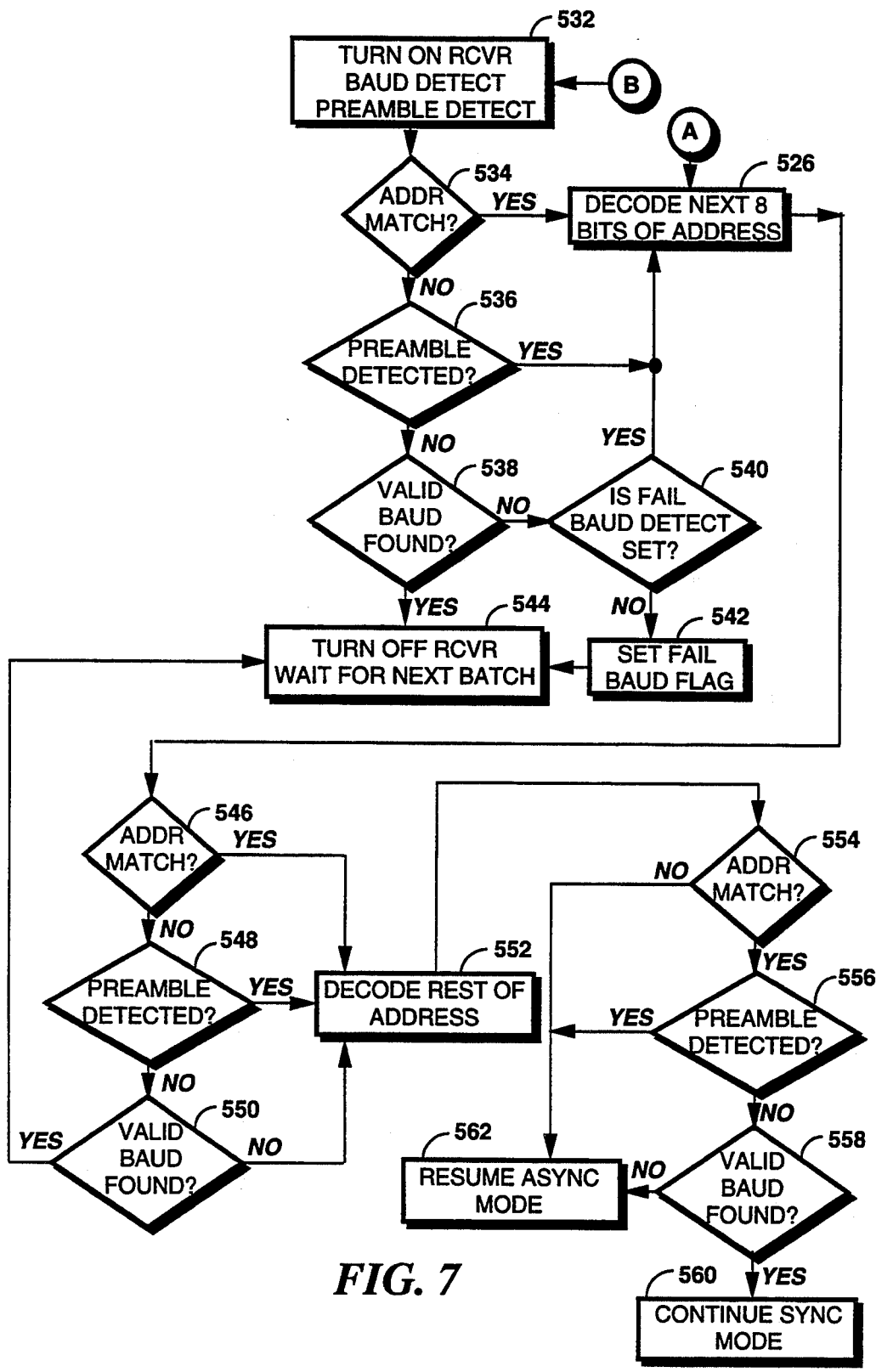

The flow diagram of FIG. 6 continues in FIG. 7 which further illustrates the operation of the selective call receiver of FIG. 3. In step 532, the receiver turns on enabling the baud rate circuitry and the preamble detector. At step 534, the first eight bits of the second address is correlated, and if the address is found preferably within two bit error at step 534, the next eight bits of the address portion is retrieved and correlated, step 526. However, when the address does not match, the receiver checks if preamble is being detected, step 536. If so, the receiver starts decoding the next eight bits of address, step 526. Alternately, when preamble is not being detected, the baud rate detector determines if valid baud rate is being received, step 538. If yes, the receiver turns off and waits for the arrival of the next frame within the next batch of information, step 544. However, when an invalid baud rate is being detected step 538, the receiver checks if this is the second detection of the invalid baud rate (e.g., if an invalid baud rate flag is set), step 540. If so, the receiver resets the invalid baud rate flag and starts decoding the next eight bits of address, step 526. However, if this was the first occurrence of the invalid baud rate detection, the receiver sets the invalid baud rate detection flag, step 542, and then turns off until the arrival of its assigned frame in the next batch, step 544.

Alternately, at steps 524 and 534, when the first eight bits of address is received (whether the first address codeword at step 524 or second address codeword at step 534), the address decoder starts decoding the next (e.g., the second) eight bits of information, step 526, to determine when address correlation results in a portion of valid address, step 546. If address is not detected, preamble detection begins, step 548. When preamble is not detected, step 550 checks when valid baud rate is being detected, and if yes, the receiver turns off and waits for its assigned frame in the next batch of information, step 544. However, if address is decoded in step 546, or preamble is detected in step 548, or lastly, if an invalid baud rate is detected, step 550, the receiver begins to decode the rest of the address, step 552. The receiver, in step 554, determines if the address matches that stored in memory, and if so, step 556 determines if preamble is being detected, and if so, finally, in step 558, the receiver determines if valid baud rate is being detected, and if so, the receiver continues operating in the synchronous mode, step 560. In the synchronous mode of operation, the receiver continues to detect its assigned frame in each batch of received information, and during address decoding, as discussed above, the receiver obtains synchronization information and therefore, does not need to turn on to receive any other synchronization codewords. However, if at step 554 an address match was not found, or at step 556 preamble was detected, or the invalid baud rate was detected, the receiver discontinues its synchronous mode of operation and begins asynchronous mode of operation, step 562. In asynchronous mode of operation, the receiver starts searching the received information for preamble and synchronization codeword, because the receiver, at this point, assumes that it has either lost synchronization to the received signal, or is not receiving any transmission from the base site transmitter.

In this way, the receiver, by decoding the address information, maintains synchronization, and when the receiver does not detect any recognizable address bits during the first eight bits of the first address, the receiver battery saves until its time to receive the second address. During this time, the receiver can determine if valid information is being received, and if so, continue in its synchronous mode of operation, or otherwise, proceed to detection for preamble and following synchronization codeword in the asynchronous mode under the assumption that the receiver has lost synchronization to the received-signal or is not receiving any valid signal. The receiver therefore uses address and/or data words to achieve synchronization by detecting baud rate information. The receiver also searches for preamble when address is not decoded for the first address to enable the receiver to quickly determine if the receiver is now receiving preamble information because it has lost synchronization to the previous signal. Accordingly, the receiver improves battery savings because the receiver can quickly determine if synchronization was lost by determining if preamble is being detected during the second address codeword.

In summary, there is provided a selective call receiver comprising a means for receiving paging signals including a preamble, a synchronization codeword, and at least address information. A means for controlling the supply of power to the receiving means for receiving the paging signals. A means, coupled to the controlling means, disables power to the receiving means, and a means, coupled to the receiving means, for obtaining synchronization to the paging signal is also provided. The synchronization obtaining means comprises means for detecting valid and invalid baud rates, and a means, coupled to the baud rate detecting means, detects the synchronization codeword. A means, responsive to the synchronization codeword being detected, decodes the address information. A means for maintaining synchronization to the paging signals during the address decoding. The synchronization maintaining means comprises means for selectively enabling the power supply controlling means for receiving the paging signals. The baud rate detecting means, responsive to the power being supplied to the receiving means, detects baud rate during at least first and second portions of the address. A means, responsive to the second portion of the address being received, detects preamble during at least a portion of a second address. A means, coupled to the receiving means, initiates an asynchronous mode of receiving and a synchronous mode of receiving in response to the baud rate detecting means detecting two invalid baud rates.

We claim:
1. A selective call receiver, comprising:
   a receiver for receiving paging signals including a preamble, a synchronization codeword, and at least an address;
   a power switch for controlling a supply of power to said receiver for receiving the paging signals;
   a baud rate detector, coupled to the receiver, for detecting a baud rate of the paging signals;
   a decoder controller, coupled to said receiver, for obtaining synchronization to the paging signals, the decoder/controller comprising:
      a preamble detector, responsive to the baud rate detector detecting a valid baud rate, for detecting preamble in the paging signals; and
      a synchronization codeword detector, in response to the preamble being detected, for detecting the synchronization codeword; and
      an address decoder, responsive to the synchronization codeword being detected, for decoding the address in an assigned frame of the paging signals;
   the decoder/controller maintaining synchronization to the paging signals during address decoding by selectively enabling the power switch for controlling the supply of power to the receiver for receiving the paging signals;
   said baud rate detector, responsive to power being supplied to said receiver, detects baud rate during a time period when the address decoder is decoding at least a first portion of the address, the address having at least the first portion and a second portion; and
      the power switch supplies power to said receiver and the address decoder decodes the second portion of the address while the baud rate detector detects baud rate during said second portion of the address wherein the decoder/controller, in response to an invalid baud rate being detected, initiates the preamble detector for detecting preamble during the second portion of the address.

2. The selective call receiver according to claim 1 further comprising a disabling means for disabling power to said receiver when the invalid baud rate is detected.

3. The selective call receiver according to claim 1 further comprising an initiating means, responsive to said preamble detector decoding preamble in the second portion of address, for initiating an asynchronous receiving mode of said receiver.

4. The selective call receiver according to claim 3 wherein the initiating means initiates a synchronous receiving mode of said receiver in response to said decoder/controller being able to maintain synchronization to the paging signals during address decoding in the assigned frame.

5. A method for reducing power consumption in a selective call receiver which consumes power, the method comprising the steps of:
   (a) receiving paging signals including a preamble, a synchronization codeword, and at least an address;
   (b) controlling a supply of power for receiving the paging signals;
   (b1) detecting a baud rate of the paging signals:
   (c) obtaining synchronization to the paging signals wherein the steps of obtaining synchronization comprising the steps of:
   (d) detecting preamble of the paging signals in response to step (b1) detecting a valid baud rate; and
   (e) detecting the synchronization codeword responsive to step (d);
   (f) decoding the address in response to step (e);
   (g) maintaining synchronization to the paging signals during step (f), said step of maintaining synchronization, comprising steps of:
      (h) selectively enabling the step (b) of controlling the power supply for receiving the paging signals;
      (i) initiating said step (b1) of detecting baud rate during at least first and second portions of the address; and
      (j) continuing the step (f) of decoding for decoding the second portion of the address while said step (b1) of detecting detects the baud rate during the second portion of the address and responsive to an invalid baud rate being detected, said step (d) of detecting detects preamble during the second portion of the address.

6. The method according to claim 5 wherein said step (c) of obtaining synchronization obtains synchronization in response to said step (b1) of detecting two invalid baud rates.

7. The method according to claim 5 wherein the step of initiating initiates the step of receiving for receiving paging signals in synchronous and asynchronous modes in response to the step (b1) of detecting valid baud rate and invalid baud rate respectively in the second portion of the address.

8. A selective call receiver, comprising:
   a receiver for receiving paging signals including a preamble, a synchronization codeword, and at least an address;
   a power switch for controlling a supply of power to said receiver for receiving the paging signals;
   means coupled to the power switch for disabling power to said receiver;
   a baud rate detector, coupled to the receiver, for detecting a baud rate of the paging signals:
   a decoder controller, coupled to said receiver, for obtaining synchronization to the paging signals, the decoder/controller comprising:
      a preamble detector detecting preamble in the paging signals in response to the baud rate detector detecting valid baud rate; and
      a synchronization codeword detector, in response to the preamble being detected, for detecting the synchronization codeword; and
      an address decoder, responsive to the synchronization codeword being detected, for decoding the address in an assigned frame of the paging signals;
   the decoder/controller maintaining synchronization to the paging signals during address decoding by selectively enabling the power switch for controlling the supply of power to the receiver for receiving the paging signals;
   said baud rate detector, responsive to power being supplied to said receiver, for detecting baud rate during a time period when the address decoder is decoding at least a first portion of the address, the address having at least the first portion and a second portion;
   the power switch supplies power to said receiver and the address decoder decodes the second portion of the address while the baud rate detector detects baud rate during said second portion of the address wherein the decoder/controller, in response to an invalid baud rate being detected, initiates the preamble detector for detecting preamble during the second portion of the address; and means, coupled to the receiver, for initiating an asynchronous mode of receiving of said receiver in response to the baud rate detector detecting two invalid baud rates.

* * * * *